P. R. ZIECHE.
TRACTOR WHEEL.
APPLICATION FILED SEPT. 25, 1917.

1,342,493.

Patented June 8, 1920.

INVENTOR.
P. R. ZIECHE
BY Milton S. Crandall,
ATTORNEYS.

UNITED STATES PATENT OFFICE.

PAUL R. ZIECHE, OF MOVILLE TOWNSHIP, WOODBURY COUNTY, IOWA.

TRACTOR-WHEEL.

1,342,493.  Specification of Letters Patent.  Patented June 8, 1920.

Application filed September 25, 1917. Serial No. 193,062.

*To all whom it may concern:*

Be it known that I, PAUL R. ZIECHE, a citizen of the United States, and a resident of Moville township, in the county of Woodbury and State of Iowa, have invented certain new and useful Improvements in Tractor-Wheels, of which the following is a specification.

This invention relates to traction wheels for motor-vehicles.

The invention aims primarily to provide an improved traction wheel for tractors.

Another object of the invention is the production of a traction wheel embodying certain novel features of construction which improve traction and yet pack the ground comparatively little, thus particularly adapting the device for tractors used on plowed or soft ground.

Still another object of the invention is the production of an improved traction wheel simple, light and inexpensive in construction yet stable and efficient in operation.

With these and other objects in view, the invention, consisting in the construction, combination and novel arrangement of parts will be fully understood from the following description, reference being had to the accompanying drawings which form a part of this application and in which like characters of reference indicate corresponding parts throughout the several views of which, Figure 1 is a side elevation of a wheel constructed in accordance with the invention;

Figure 2:
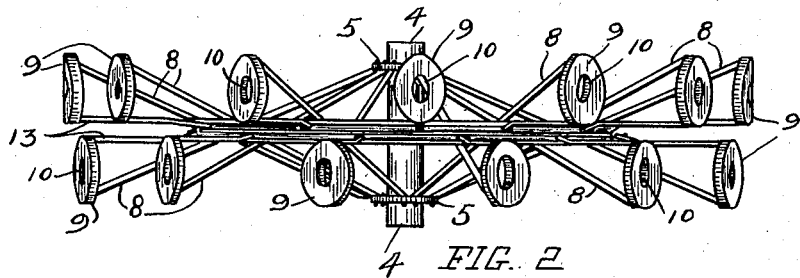
Fig. 2 is a plan of the same.

Referring, now, to the illustrations, 4, represents the hub of the wheel, provided at its ends with annular flanges 5. 6, is the rim, formed preferably with side flanges, 7, flared at an angle to the transverse axis of the rim. The rim and hub are interconnected by two series of spokes, 8, the inner ends of the spokes of the two series being secured, respectively, to the flanges of the hub, and their intermediate portions are embraced by and secured to the outer sides of the rim flanges, 7. The two series of spokes, it will be observed, are inclined toward and intersect each other within the rim, whereby the spokes of each series are connected to opposite hub and rim flanges; and the extended, or outer ends of the spokes are staggered, with respect to those of the companion series, as clearly shown in Fig. 2.

Figure 1:
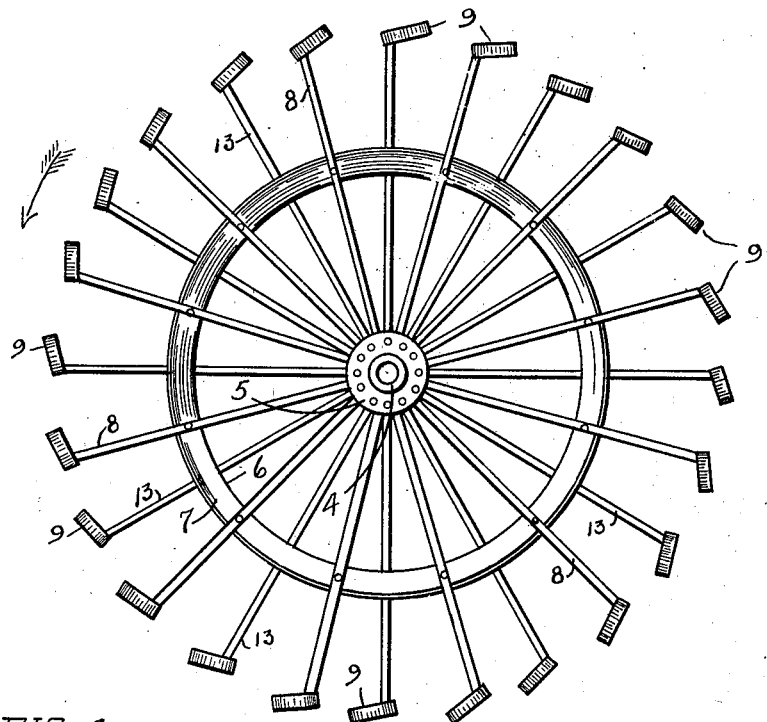
Figure 3:
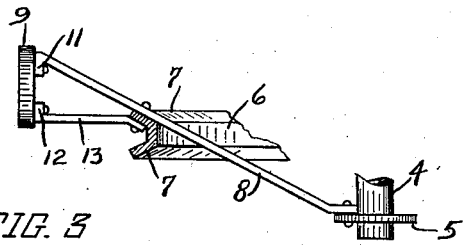
Fig. 3 is a fragmentary plan of the hub, and rim, and one of the tread members.

On the spokes are mounted tread members, preferably consisting of disks, 9, having center openings, 10, the disks being secured, respectively, adjacent their outer edges, to the overturned ends, 11 (Fig. 3) of the spokes, and adjacent their inner edges to the overturned ends, 12, of the radial arms, 13, secured to the inner sides of the flanges, 7. The disks are extended tangentially from the peripheral contour of the wheel oppositely to the direction of normal, or forward rotation of the wheel, which direction of rotation is indicated by the arrow in Fig. 1.

It is evident that in operation the wheel, as thus constructed, insures perfect traction and yet compresses a comparatively small area of ground.

Having thus described my invention what I claim as new and desire to secure by Letters Patent of the United States, is,—

A traction wheel including a hub, a rim having outwardly flared flanges at its sides, two series of spokes secured respectively to the ends of the hubs and intersecting each other within the rim, the spokes of each series being secured to the flanges opposite the end of the hub to which they are secured, the spokes being extended from the rim, and tread members on the ends of the spokes.

In testimony whereof, I have hereunto set my hand this 19th day of September, 1917.

PAUL R. ZIECHE.